(12) United States Patent
Cawse et al.

(10) Patent No.: US 6,194,477 B1
(45) Date of Patent: Feb. 27, 2001

(54) METHOD OF MAKING HONEYCOMB PANEL STRUCTURES

(75) Inventors: John Leslie Cawse; Ayub Khan; Graham Kemp, all of Cambs; Terence Charles Webb, Saffron Walden, all of (GB)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/312,134

(22) Filed: May 14, 1999

(30) Foreign Application Priority Data

Jun. 25, 1998 (EP) .................................................. 98305037
Feb. 3, 1999 (EP) .................................................. 99300809

(51) Int. Cl.[7] .............................. C08J 9/00; B21D 35/00
(52) U.S. Cl. .............................. 521/76; 521/82; 521/84.1; 162/101; 162/109; 162/115; 162/218; 427/307; 427/308; 427/372.2; 428/593
(58) Field of Search ................................ 521/76, 82, 84.1; 162/101, 109, 115, 218; 106/122; 427/307, 308, 331, 372.2; 428/593

(56) References Cited

FOREIGN PATENT DOCUMENTS

| 0 820 858 A1 | 1/1998 | (EP) . |
| 1 042 762 | 3/1963 | (GB) . |
| 1 395 729 | 12/1971 | (GB) . |
| 1 444 346 | 8/1972 | (GB) . |

*Primary Examiner*—Nathan M. Nutter
(74) *Attorney, Agent, or Firm*—W. Mark Bielawski; David J. Oldenkamp

(57) ABSTRACT

Expanded cellular structures are formed from dense nonporous cellulose paper with an air permeance of less than 30 ml/min which cellular structure is provided with a shape retention of at least 90%. The shape stability is obtained by forming the cellular structure, spraying with an aqueous liquid and heating, the amount of liquid, time and temperature of heating being selected and sufficient to provide the desired shape retention. The minimum amount of water is at least 30 weight % of dry paper more usually at least 75% with minimum heating of 1 minute at 100° C.

20 Claims, No Drawings

METHOD OF MAKING HONEYCOMB PANEL STRUCTURES

BACKGROUND OF THE INVENTION

1. Field of the Invention

This invention relates to the manufacture of panels with regularly shaped (usually hexagonal) cells sometimes known as honeycomb panels.

2. Description of Related Art

The manufacture of honeycomb panels from sheet material can be carried out employing various sheet materials. Historically the sheet material was pre-corrugated and the corrugated sheets were adhered along the land areas. This, however, required good registration of the cells and tends now only to be used for high modulus materials such as metal sheets.

For paper or similar fibrous sheet materials a general method comprises printing or applying parallel lines known as node lines of adhesives. The printed sheet material is then cut into individual sheets which are stacked so that the node lines on adjacent sheets are displaced from each other by one half the pitch (distance between) of the lines. The resulting stack can contain several hundred to several thousand sheets depending on the size of the final honeycomb block required. Depending on the nature of the adhesive means, these adhesives are then set so as to join the sheets and the resulting block is expanded by pressure on the sides of the block at right angles to the direction of the node lines which force expansion, i.e., separation of the sheets at each cell point to create a cellular structure. The resulting block is then cut into panels by cutting at right angles to the node lines to form a core for a composite panel. Surface sheets may then be applied on one or both sides of the core across the surface of the open cells to form a composite panel.

These cores have found wide usage in many industries for such applications as packaging, furniture, display panels and in general any application for which there is a requirement for a stiff, yet lightweight element.

Originally, these cores were made from Kraft-type papers in which the paper walls of the cells were bonded together with simple adhesives with or without a subsequent coating of a polymeric resin over the entire surface of the core material.

However, paper honeycomb materials suffer from a major disadvantage in that they have low strength, particularly in compression. When resins are incorporated into such paper core materials, the effect is to improve considerably the compression strength, but the resulting core material is then very brittle and has poor resilience.

A further major disadvantage of cellulose based paper honeycombs is their poor fire resistance. Techniques for imparting fire-resistance have included impregnating a core made from relatively porous paper, e.g., Kraft paper with a water-based phenolic resin and then coating with a polymer (for example in latex form) which contains a dispersed particulate flame retardant. This is described in U.K. Patent GB-A-1 444 346. The first resin coating renders the core paper more moisture resistant but as it is Kraft paper the core is very brittle. Also the cores tend to be very heavy because formed from Kraft paper have mechanical properties. Paper has been tried which contains flame retardant but this is more difficult to print with node adhesive and is more stiffer making expansion more difficult. Japanese Patent JP 06272190, A2 940 927 (Nettetsu Mining Co.) describes a sheet of 65–80% fireproofing powder, 3477 flame-retardant resin powder and 15–25 cellulose fibers but this is essentially an inorganic sheet not a cellulosic fiber paper. In another patent (JP 08103979 A2 960 423) of the same company, a core from this sheet, formed into a honeycomb, is impregnated with fire retardants such as guanidine phosphate.

In recognition of these deficiencies, the composites industry developed honeycomb core materials based on other paper-like materials, and especially aramid paper, i.e., one made from fibers of highly aromatic polyamide resins. The best known example is Nomex® poly (m-phenylene isophthalamide) (product of DuPont). These aramid papers comprise one or more fibers, e.g., Nomex® or Kevlar® in the form of fibers and so-called fibrids which are formed into an impenetrable sheet. The development of such cores meant that honeycomb structures could now be used in more demanding applications such as flooring for aircraft and ships, components for skis and snowboards and other applications where a light, stiff, high toughness structural material is required. However, aramid papers are much higher in cost than paper, and in many applications this cost prohibits the use of aramid cores.

Additional factors are the weight and poor properties of the conventional papers (Kraft papers) employed. It would be desirable to improve the weight (density) of the core and the strength of the cellular structure.

In the manufacture of an aramid paper honeycomb, the stack or block of sheets after placing in a heated press and curing the node line adhesive is removed from the press and expanded to form hexagonal cells. A block of aramid paper prior to expansion can be sprayed with water to facilitate expansion but this cannot be applied to cellulose papers, such as Kraft paper, as wet paper cannot be expanded as it collapses. The expanded block of aramid paper is set in this shape by heating in the expanded state to a temperature exceeding the glass transition temperature (Tg) of the aramid resin and then cooling. It is not possible to "heat set" cellulose-based papers in this way because cellulose degrades thermally at temperatures well below its Tg. However, it would still be desirable to be able to set the shape of a paper honeycomb, because otherwise once expanded the honeycomb will collapse. Also, it is desirable to be able to remove expanded paper honeycomb from its expansion frame prior to resin coating. Although possible, it is generally not advantageous to resin coat the expanded honeycomb while it is attached to the expansion frame. This is because of the problem of removing cured resin from the frame after the curing process has been carried out.

Heat-setting on the expansion frame has been affected with Kraft paper. This may be possible because of the inherent moisture content of Kraft paper. In many cases, however, there is no necessity to stabilize the Kraft paper core as it is continuously expanded and fed into its intended final position.

SUMMARY OF THE INVENTION

According to the present invention there is provided a method of producing a cellular material in which an expanded cellular structure is formed from a dense, non-porous cellulose paper, which paper has an air permeance of less than 30 ml/min, an aqueous composition is applied to the cellular structure which is then heated sufficiently to stabilize the structure for commercial stability and the resulting cellular structure is coated with a thermosetting resin and the resin is cured.

In another aspect of the invention there is provided a cellular structured core for a composite cellular material in which the walls of the cells are formed from a cell-shape-set dense low porosity cellulose based paper of air-permeance (before being formed into cells) of less than 30 ml/min and having a shape retention of 90%, preferably 95%.

The above discussed and many other features and attendant advantages will become better understood by reference to the following detailed description.

DETAILED DESCRIPTION OF THE INVENTION

Shape retention for commercial stability is usually at least 90% preferably 95%. Preferably the amount of water and temperature and time of heating are sufficient to provide a shape retention of 90%, most preferably 95%. In particular the amount of moisture added is sufficient to provide at least 30% by weight of the dry paper core and the heating is at least 1 minute at a temperature of at least 100° C., the amount of moisture, temperature and time of heating being such as to provide a shape retention stability of at least 90% after 24 hours in the absence of external constraint, most particularly the amount of water is at least 60% by weight of the dry paper core and the shape retention obtained is at least 95% and especially preferred is an amount of water of at least 75% by weight of the dry paper core.

By shape set is meant that the sheets forming the wall of the cells are shaped into cellular structure and retain the shape of the cell when not under external constraint.

Matsuda et al., J. of Pulp and Paper Science: Vol. 20, No. 11, page J323–327, November 11th, 1994, discuss the effect of moisture and heat on Kraft paper and particularly the decrease in the water retention value resulting from heating which is speculated as resulting from formation of intermolecular hydrogen bonds. Thus there is no discussion of the effects on dense, non-porous cellulose paper or any indication of greater shape retention.

In WO96/31339 Besin B.V. there is disclosed applying a waterproof coating by moistening an expanded paper honeycomb core material and then applying a powder of polymeric material. The moisture applied is 15–30% by weight of the paper core. The function of the moisture is to enhance the adherence of the powder coating. There is no discussion of use of a paper such as a glassine nor any indication of greater stability in the resulting core.

To determine whether the shape-retention of the formed cellular structure is adequate, the retention is measured as follows:

The core material is formed in a cellular structure as described above including the final step of expanding out the cellular structures on a frame. The cell dimension is measured as $d_0$.

The core is set by spraying with water (or other aqueous liquid) and heated (preferably in an oven).

The core is removed from the frame and allowed to stand unconstrained for 24 hours.

The cell dimension is measured again on the unconstrained core (as measurement $d_1$).

Shape retention is:

$$100 \times \frac{d_1}{d_0}\%$$

A satisfactory shape-retention is one which is commercially sufficient for structural integrity in the final product. Usually this will be at least 90% and preferably 95%. Normally a shape retention of less than 90% will not give sufficient stability for further handling or stability for the final product.

Preferably the aqueous liquid is a solution of a fire retardant material. This method produces a light-weight honeycomb from a paper material which closely matches the excellent properties obtained with aramid papers but with considerable saving in cost and where the aqueous solution contains fire retardant matches the excellent fire retarding properties of aramid cellular structures.

Specifically, the cellular structure is formed by the steps outlined above of stacking sheets bearing node lines of adhesive, curing the adhesive under pressure with heat, placing the cured stack in a honeycomb expansion frame, expanding the cellular structure, spraying the expanded structure with water or other aqueous liquid, heating for a sufficient time to set the shape of the cellular structure, removing from the expansion frame, applying a thermosetting resin and curing the resin. The set cellular structure can readily be removed from the expansion frame after the setting step but prior to resin dipping. Where the aqueous liquid contains a flame retardant, this avoids the necessity of incorporating flame retardant at an earlier paper making stage.

The aqueous liquid can be applied by spraying or other techniques, for example dipping or curtain coating.

The aqueous liquid used for setting the cellular structure can be simple water but can contain biocides including anti-fungal agents, surfactants, and possibly organic liquids to assist in penetration of water and to carry flame retardants.

The amount of aqueous liquid applied to the cellular structure can readily be determined by simple testing in that it is sufficient to incorporate sufficient aqueous liquid whereby on heating an adequate setting (shape retention) effect is achieved. The amount of liquid should be such as to moisten the surfaces of the paper throughout the block. The addition of too much moisture so that the block is saturated and dripping is to be avoided as the block might collapse. Particularly where the liquid contains a flame retardant, the amount of solution or dispersion and strength of solution or dispersion should be such as to deposit an appropriate amount of flame retardant in the paper structure. The desired shape retention, as described, is such as to provide a rigidity to the structure which is sufficient for commercial purposes usually at least 90%. Care should be taken that the amount of liquid applied is not such as to soften excessively the cellular structure.

As to the limits for water loading it is possible to use water loadings as low as, say 30% by weight of the dry paper core but this will not give a robust product: in other words, a core produced with 40% water load will shrink if kept in a moist (i.e. high relative humidity) environment for a prolonged period. 30 to 40% probably represents an absolute lower limit, and only if the expanded core is to be immediately coated with thermoset resin. For a reliable process, 60% water loading is preferable and 70% is most preferable.

The lowest limit in any given situation (i.e. temperature and time of heating and conditions for subsequent treatment) can readily be determined empirically by the stabilization measurement technique already described. The paper used will usually have an inherent water content (e.g., 4% by weight) which should be taken into consideration when calculating the amount of water to be added.

The papers employed in this invention are dense papers of air permeance of less than 30 ml/min typified by the type of paper known as glassine papers. In the manufacture of these papers the paper pulp is beaten or refined to a high degree to reduce or fray the paper fibers. The resulting sheets can also be highly calendared. The resultant paper is dense and very often translucent. The manufacture of this type of paper is discussed in the article on Paper in the ENCYCLOPEDIA OF POLYMER SCIENCE AND TECHNOLOGY, Vol. 9, John Wiley 1968, Page 719.

The low porosity of these papers is evidenced by the wicking force (described in detail later) which measures liquid pick-up as distinct from air permeability.

The papers used in this invention have not hitherto been employed in forming honeycomb cellular structures. This is believed to be because they are difficult to shape. The process of the invention is surprising therefore in that it successfully enables such papers to be formed into a cellular structure.

Thus the papers employed in the method of the invention are very dense papers having a smooth surface, high strength and low porosity air permeance less than 30 ml/min. The weight of the paper can be from 30 to 150 g/m². The surface, however, should be sufficiently porous to permit adhesion of the resin materials used in formation of the cellular structure. For that reason glassine papers which have been surface treated subsequent to calendaring with substances capable of generating a water repellent surface, for example siliconized surfaces or surfaces treated with fluorinated compositions, are generally unsuitable for this invention since they tend to prevent the adhesion of the resin materials. The paper also will have a low wicking force, i.e., a tendency to absorb organic solutions.

The resins used for forming the node lines will be those conventional in the manufacture of cellular structures from paper materials, for example thermosetting epoxy adhesives. Typical adhesives will be sodium silicate, starch, polyvinyl acetate, phenolic resins, resorcinol-formaldehyde resins, urea-formaldehyde resins and epoxy resins. The first three can bond at room temperature and the rest will often require heat.

In the particularly preferred embodiment of the invention, the aqueous solution can be a solution or dispersion of a flame retardant material. Preferred flame retardant materials are nitrogenous phosphates, particularly polyphosphates, and include nitrogen-containing salts of a phosphoric acid, particularly amine, ammonium or melamine and most preferably ammonium polyphosphate. Other types of fire retardants which could be used include ammonium orthophosphate, ethylene diamine phosphate and other amine phosphates, for example melamine phosphate. Others which could be used in place of or in addition to these include brominated compounds such as brominated phenols, imides, and alicyclics; chlorinated compounds, such as chlorinated paraffins; alumina trihydrate; magnesium hydroxide; zinc borate; and aromatic phosphate esters and phosphonates. The content of flame retardant in the aqueous liquid will depend on the amount of aqueous liquid left on the core after application. Normally a solution of 0.1% to 40% phosphate by weight solution would be used.

The amount of flame retardant added should be such as to result in a weight of dry flame retardant by weight of dry core of 0.5 to 20% of the total core weight especially 5% to 10%.

The application of the flame-retardant to the walls of the cellular structure by an aqueous system with subsequent drying may leave a coating of flame-retardant or incorporate it into the body of the structure by soaking in when wet.

The conditions of heating and time for heat setting the block depend to some extent on the size of the block and factors such as the paper thickness and cell size. The process can be carried out at a temperature of 100 to 190° C. for periods of from 1 minute to 1 hour preferably 10–40 minutes. A typical combination would be 20 minutes at 140° C., or until the weight of the block has stopped dropping.

The amounts of water added, time and temperature of heating tend to be empirical but determinable by simple testing to produce a cellular structure which has a set stability, that the structure retains its cellular shape when released from constraint. The heating conditions appear to be less critical than the degree of wetting, i.e., amount of water added. Very often the combination of conditions can be determined to a first approximation by folding a sheet of the paper, applying moisture then heat for a time and determining if the sheet retains the fold on release from constraint.

The resins used for coating the core of this invention may be selected from phenolics, epoxies, cyanate esters, bismaleimides, polyimide, benzo-bisoxazine, unsaturated polyesters and others well known in the art. The resin may beneficially contain particles of a thermosetting or thermoplastic polymer, as previously described in EP 0,820,858. The resin may also contain flame retardants, for example of the phosphate ester type, or particulate ammonium polyphosphates or other particulate materials, but this is not normally necessary owing to the excellent fire retarding properties obtained by following the above application procedure.

The resulting honeycomb produced can be formed into a conventional sandwich structure. The assembly may comprise an adhesive layer between the core and any outer skin or skins. The presence of a separate adhesive layer is however not necessary. The adhesive, if used, may be any of the types known in the art, i.e., phenolic, epoxy, contact or thermoplastic. There may be one or more skins on either or both sides of the core, and the skins may be metal, particularly aluminum; wood; prepreg, for example a glass, carbon, polyethylene or Kevlar reinforced prepreg in which the prepreg matrix can be any of the materials known in the art for instance cyanate ester, epoxy, phenolic, polyester and the reinforcement may be unidirectional or multi-directional, and may be in the form of a cloth or mat, or may be composed of discontinuous fibers; or a pre-cured laminate such as a phenolic, melamine/formaldehyde or urea/formaldehyde laminate; or there may be combinations of the above skins, for example a metal skin on one side and a glass prepreg on the other side.

In some instances, the honeycomb cells can be filled with polymer foam before the skins are applied. This can be useful in applications where very good sound adsorption or thermal insulation is required. Cells can also be filled with various types of powders, for similar reasons.

The invention will now be illustrated by the accompanying Examples which are, however, only illustrative of the invention.

EXAMPLE 1

Honeycomb core samples were prepared from bleached and unbleached glassine papers at 65 and 94 grams per square meter (gsm), a machine glazed paper at 40 gsm, an aramid paper Nomex® at 41 gsm, Kraft paper at 89 gsm and a bleached neutral sized paper at 80 gsm.

The air permeance values of these papers were measured using the Bendtsen test, BS 6538:2 and the results are recorded in Table 1. In the same Table as a measure of Wicking Force is shown tendency to absorb organic solution. This is measured on a recording microbalance (model Cahn Instruments DCA 315) and indicates the force exerted when a sample of the paper of a fixed size is immersed in a solvent, in this case hexadecane. The downward force exerted by surface tension is measured by the microbalance to which the sample of paper is attached.

TABLE 1

| Paper Type | Paper Weight gsm | Air Permeance ml/minute | Wicking Force hexadecane, mg |
|---|---|---|---|
| Kraft | 89 | 530 | 114.3 |
| neutral sized | 80 | 155 | 109.7 |
| glassine, bleached | 65 | 5 | 104.1 |
| glassin, unbleached | 94 | 5 | 103.6 |
| machine glazed | 40 | 170 | 110.1 |
| Nomex ® | 41 | 5 | 103.5 |

Blocks of adhered sheets were produced by printing the papers with a pattern of node lines using a solvent based thermosetting epoxy adhesive, drying to remove solvent and stacking the sheets such that the node lines in adjacent sheets had a half pitch stagger. The stacks were cured at 140° C. for 100 minutes under a pressure of 25 bar. The cured blocks were expanded to a uniform hexagonal cell shape in a conventional expansion frame. The cells were either 5 mm or 6.5 mm wide.

The blocks of expanded paper were set in shape by spraying with a fine water mist (except Nomex®) and then placing in an oven at 140° C. for 40 minutes to give a final water loading content of 75% by dry weight of paper. In preferred cases, the water mist contained dissolved ammonium polyphosphate.

The resulting blocks were dipped into a phenolic resole resin (phenol to formaldehyde molar ratio 0.67:1) from acetone solution. Excess solvent was removed by air purging. The core was placed in an oven and subjected to a cure cycle of 140° C. for one hour. Each cured block was cut at right angles to the node lines into slices 12.7 mm thick.

The papers having air permeance figures of upwards of 100 ml/min and Wicking Forces exceeding 110 mg gave honeycomb core samples which were brittle: that is, when the cells were compressed the paper fractured completely. Those papers having permeance values of 5 ml/min and Wicking Forces around 140 mg all gave honeycomb which when coated with phenolic resin possessed excellent mechanical properties and were not brittle: that is, when the cells were compressed the resin cracked but the underlying paper retained its integrity. The results are summarized in Table 2.

TABLE 2

| Paper | Appearance of Coated Honeycomb |
|---|---|
| Kraft | Very brittle |
| neutral sized | Brittle |
| glassine, bleached | Tough |
| glassine, unbleached | Tough |
| machine glazed | Brittle |
| Nomex ® | Tough |

The compression and short beam shear properties of the core were tested as follows:

For short beam shear specimens, the honeycomb was placed between two sheets of phenolic prepreg with woven glass reinforcement (glass content 57%). Curing of the specimens was carried out at 135° C. for 90 minutes with a heat up rate of 5° C. per minute. Specimens were cut to 150×75×12.7 mm. For compression samples, squares of core 75×75×12.7 mm were cut. Compression strength was measured on an Instron 4483 test machine operated at a crosshead speed of 0.5 mm/minute. Short beam shear testing was carried out on a Zwick 2010 machine at a speed of 2 mm/minute.

The results are shown in Table 3 as the mean of three samples.

TABLE 3

| Paper | Cell Size mm | Density of Core kg/m$^3$ | Compression Strength Mpa | Shear Strength N |
|---|---|---|---|---|
| Nomex ® | 6.5 | 35 | 0.87 | 586 |
| Glassine, 65 gsm | 5.0 | 42 | 1.27 | 1124 |
| Glassine, 94 gsm | 6.5 | 36 | 1.27 | 831 |

EXAMPLE 2

A series of core samples were produced in which ammonium polyphosphate was applied by spraying from aqueous solution to the expanded paper core prior to heat setting.

In run 2.3, a solution of ammonium polyphosphate (APP) was prepared in 100 parts of water. This solution was sprayed on to the expanded paper core, then the core was placed in an oven at 140° C. for 40 minutes to set the core and dry the polyphosphate coating. The dry core was then coated with an acetone solution of a phenolic resole dip resin as in Example 1.

In run 2.4, in addition to the ammonium polyphosphate being added at the expansion stage, a fine particle size water insoluble (8 micron) ammonium polyphosphate, $NH_4PO_3)_n$, with a value of n>1000, was dispersed in the phenolic resin used for coating the paper honeycomb, at a level 20 parts by weight of ammonium polyphosphate to 100 parts by weight of phenolic resin solids.

For comparison, cellular structures were prepared (without application of flame retardants) from aramid paper (2.1) and from a glassine paper (2.2).

The fire properties of the materials were tested as follows. Samples of the core materials were clamped vertically and a Bunsen burner flame, at a temperature of 820° C. was applied under the core sample. After 60 seconds the specimen was removed from the flame, and the extent of charring noted.

The flame-retardant properties are shown in Table 4.

TABLE 4

| | Paper | Flame Retardant | Density of Core kg/m$^3$ | Vertical Burn Length mm |
|---|---|---|---|---|
| 2.1 | Aramid Paper (Nomex ®) | None | 48 | 22 |
| 2.2 | Glassine, 65 gsm | None | 36 | 150 |
| 2.3 | Glassine, 65 gsm | APP | 58 | 22 |
| 2.4 | Glassine, 65 gsm | APP | 42 | 12 |

The results show that honeycomb core materials with excellent mechanical properties and flame resistance may be produced from the method of the present invention.

EXAMPLE 3

This example demonstrates the preferred conditions for producing a paper core of the current invention, using a glassine or highly calendared-type paper, and with a stable cell size. The core cell size must be stable after expansion and heat setting, because optimum mechanical properties of the final, resin-coated core can be developed only if the cells are of uniform shape.

Samples of glassine paper core (65 gsm) were prepared as in Example 1 and were expanded on to a frame so as to produce an average initial cell size of 5 mm. The core sample were weighed and then sprayed with a fine mist of water and re-weighed. Levels of water loading of between 4% and 75% of the dry weight of paper were used. The paper in this example contains 4% moisture as supplied, under normal conditions of storage. This level of water was accounted for in the figures quoted in Table 5.

The cores, still in the expanded state and held in place on a frame, were heated in an oven for various times and at various temperatures, and after removing from the oven and allowing to cool to room temperature, the core was taken off the frame and left to stand for 24 hours at a relative humidity (R.H.) of either 47% or 70%. After this time the average cell sizes were again measured. The percentage of cell size is quoted in Table 5.

TABLE 5

| Sample | % Water | Temperature °C. | Time, min | % Retention @ 47% R.H. | % Retention @ 70% R.H. |
|---|---|---|---|---|---|
| 1 | 4 | 135 | 10 | 57 | 48 |
| 2 | 4 | 160 | 90 | 54 | 56 |
| 3 | 40 | 135 | 50 | 89 | 86 |
| 4 | 40 | 160 | 10 | 95 | 82 |
| 5 | 75 | 110 | 10 | 95 | 96 |
| 6 | 75 | 110 | 90 | 96 | 95 |

It can be seen from Table 5 that "dry" paper, i.e., paper which contains only its inherent equilibrium water content of approximately 4% cannot be set in shape by heat alone. Similarly, core which has been treated with 40% of its weight in water has an improved cell shape retention, but this is highly dependent on the ambient storage conditions of the core, and the core contracts if stored at higher relative humidities. This is important in climates where the R.H. of the atmosphere can vary markedly with the seasons, or with the time of day, or in circumstances where the freshly expanded core cannot be immediately coated with the resin. However, paper core of the current invention which has been treated to provide 75% water loading, retains essentially all its expanded size, irrespective of ambient storage conditions.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A method for making a structurally stable cellular structure comprising the steps of:
   providing a dry cellular structure comprising dense, non-porous paper having an air permeability of less than 30 ml/min wherein said dry cellular structure has a shape retention of less than 90%;
   treating said dry cellular structure with a sufficient amount of an aqueous liquid to provide a wet cellular structure comprising water in an amount equal to at least 30% by weight of said dry cellular structure; and
   heating said wet cellular structure for a sufficient time at a sufficient temperature to dry said wet cellular structure to provide a structurally stable cellular structure having a shape retention of greater than 90%.

2. A method according to claim 1 which includes the step of coating said structurally stable cellular structure with a coating resin.

3. A method according to claim 1 wherein said aqueous liquid comprises a flame retardant.

4. A method according to claim 3 wherein said flame retardant is a nitrogenous phosphate selected from the group consisting of amine phosphates, ammonium phosphates and melamine phosphates.

5. A method according to claim 4 wherein said flame retardant is ammonium polyphosphate.

6. A method according to claim 4 wherein said aqueous liquid comprises 0.1 to 40% by weight of said flame retardant.

7. A method according to claim 1 wherein the amount of water in said wet cellular structure is equal to at least 60% by weight of said dry cellular structure and said structurally stable cellular structure has a shape retention of greater than 95%.

8. A method according to claim 7 wherein the amount of water in said wet cellular structure is equal to at least 75% by weight of said dry cellular structure.

9. A method according to claim 1 wherein said paper has a weight of from 30 to 150 gm/m$^2$.

10. A method according to claim 2 wherein said coating resin comprises a flame retardant.

11. A method according to claim 2 wherein said coating resin comprises particles of a thermosetting or thermoplastic polymer.

12. A structurally stable cellular material made by a method comprising the steps of:
   providing a dry cellular structure comprising dense, non-porous paper having an air permeability of less than 30 ml/min wherein said dry cellular structure has a shape retention of less than 90%;
   treating said dry cellular structure with a sufficient amount of an aqueous liquid to provide a wet cellular structure comprising water in an amount equal to at least 30% by weight of said dry cellular structure; and
   heating said wet cellular structure for a sufficient time at a sufficient temperature to dry said wet cellular structure to provide a structurally stable cellular structure having a shape retention of greater than 90%.

13. A structurally stable cellular material according to claim 12 which is further coated with a coating resin.

14. A structurally stable cellular material according to claim 12 wherein said aqueous liquid comprises a flame retardant.

15. A structurally stable cellular material according to claim 14 wherein said flame retardant is ammonium polyphosphate.

16. A structurally stable cellular material according to claim 12 wherein the amount of water in said wet cellular structure is equal to at least 60% by weight of said dry cellular structure and said structurally stable cellular structure has a shape retention of greater than 95%.

17. A structurally stable cellular material according to claim 16 wherein the amount of water is said wet cellular structure is equal to at least 75% by weight of said dry cellular structure.

18. A structurally stable cellular material according to claim 12 wherein said paper has a weight of from 30 to 150 gm/m$^2$.

19. A structurally stable cellular material according to claim 13 wherein said coating resin comprises a flame retardant.

20. A structurally stable cellular material according to claim 13 wherein said coating resin comprises particles of a thermosetting or thermoplastic polymer.

* * * * *